United States Patent Office 3,425,967
Patented Feb. 4, 1969

3,425,967
FOAMABLE ORGANOPOLYSILOXANE COMPOSITION AND FOAMED PRODUCT OBTAINED THEREFROM
Frank J. Modic, Scotia, N.Y., assignor to General Electric Company, a corporation of New York
No Drawing. Filed Dec. 17, 1965, Ser. No. 514,675
U.S. Cl. 260—2.5    2 Claims
Int. Cl. C08g 31/09, 53/08

This invention relates to foamable compositions and to the flexible foams produced from such compositions.

Various types of silicones have been used to provide thermal insulation for surfaces subjected to extremely high temperatures. Silicones have been used in many of these applications because of the relatively good thermal stability of such materials. However, the use of silicones has been limited by several factors. First, the density of various silicone materials is relatively high, so that to provide suitable thermal insulation it has been necessary to use a greater weight of silicone than desired. The greater weight of silicone also means a greater cost. One solution to the problem of silicone weight in thermal insulation has been to provide silicone foams for thermal insulation. These foams have reduced the weight problem but have introduced several new problems. The silicone foams available prior to the present invention have not provided the desired strength, nor have they been sufficiently flame-retardant. Furthermore, upon being consumed by fire, the residue of combustion has exhibited practically no strength. Accordingly, there has been need for a silicone foam material which exhibits high strength in the foam state, which is flame retardant and which, even after being consumed by flame, will leave a residue of significant strength.

The object of the present invention is to provide an improved foamable silicone composition.

A still further object of the present invention is to provide a silicone foam of improved strength and flame-retardancy in the foamed state.

A still further object of the present invention is to provide an improved silicone foam which, upon burning, leaves a residue of significant strength.

These and other objects of my invention are accomplished by providing a composition comprising, by weight, (1) 100 parts of a vinyl chain-stopped polysiloxane having the formula:

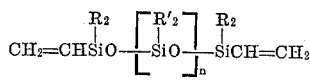

where R and R' are monovalent hydrocarbon radicals free of aliphatic unsaturation, with at least 50 mole percent of the R' groups being methyl, and $n$ has a value of from about 50 to 2,000, inclusive.

(2) from 10 to 100 parts of an organopolysiloxane copolymer comprising $(R'')_3SiO_{0.5}$ units and $SiO_2$ units and in which from about 2.5 to 10 mole percent of the silicon atoms contain silicon-bonded vinyl groups, where R" is a member selected from the class consisting of vinyl radicals and monovalent hydrocarbon radicals free of aliphatic unsaturation, (3) from 10 to 100 parts of an inorganic fibrous material selected from the class consisting of asbestos and fibrous potassium titanate, and mixtures thereof, (4) from 0 to 50 parts of a finely divided inorganic filler, (5) platinum catalyst, (6) an amount of a liquid organohydrogenpolysiloxane having the formula:

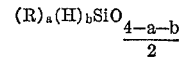

where R is as previously defined, $a$ has a value of from 1.00 to 2.10, $b$ has a value of from about 0.1 to 1.0, and the sum of $a$ plus $b$ is from about 2.00 to 2.67, sufficient to provide from about 0.5 to 1.0 silicon-bonded hydrogen atoms per silicon-bonded vinyl group in the composition, and (7) from about 1 to 5 parts of a blowing agent.

The compositions of the present invention vary from slowly flowable liquids to thick pastes which are applied by troweling. The compositions are converted to foam by heating the entire mixture of ingredients, as will be described hereinafter, to an elevated temperature, such as a temperature of 80 to 180° C. for several minutes.

When all of the components of the compositions of the present invention are mixed together, the platinum catalyst causes reaction to proceed even at room temperature. Since the blowing agent is relatively inactive at room temperature, the premature mixing of the compositions of the present invention can result in a reaction between the silicon-bonded hydrogen atoms of the organohydrogenpolysiloxane, and the silicon-bonded vinyl groups of other components of the reaction mixture before such reaction is desired.

To avoid premature curing, one of two precautions is observed. The first precaution is to maintain the reaction mixture under refrigeration, for example at a temperature of 0° C., which gives the composition a storage life of several weeks. However, this procedure is less desirable than the second precaution, which is to prepare the composition in two separate packages and combine the packages at the time the composition is to be converted to the cured silicone foam.

Where the two-package system is employed, one of the packages advantageously comprises the vinyl chain-stopped polysiloxane component 1, the organopolysiloxane component 2 comprising the $(R'')_3SiO_2$ units and the $SiO_2$ units, the inorganic fibrous material component 3, the finely divided filler component 4 when such component is used, and the platinum compound catalyst component 5. The second package of the two-package composition advantageously comprises the organohydrogenpolysiloxane component 6 and the blowing agent component 7. Often it is found desirable to include in the second package a portion of the vinyl chain-stopped organopolysiloxane component 1 which can serve as a diluent for the organohydrogenpolysiloxane component 6 in the second package of the composition. Sometimes it is also desirable to include a portion of the inorganic filler component 4 in the second package. These optional ingredients in the second package are generally selected to adjust the consistency or the effective concentration of the second package. Adjustment of effective concentration will have a subsequent effect on the ratio of the amount of the second package which must be mixed with the first package to produce the composition.

All of the components of the foamable compositions of the present invention are well known in the art. The vinyl chain-stopped organopolysiloxane component 1 is typified by various compositions within the scope of Formula 1, where the monovalent hydrocarbon radicals represented by R and R' include alkyl radicals, e.g., methyl, ethyl, propyl, butyl, octyl, etc. radicals; aryl radicals, e.g., phenyl, tolyl, xylyl, etc. radicals; cycloalkyl radicals, e.g., cyclohexyl, cycloheptyl, etc. radicals; aralkyl radicals, e.g., benzyl, phenylethyl, etc. radicals. In the preferred embodiment of my invention, all of the radicals represented by R and R' are selected from the class consisting of methyl and phenyl radicals. A typical method for preparing compositions within the scope of Equation 1 is by the alkaline rearrangement and condensation of a mixture of 1,3-divinyltetramethyldisiloxane with octamethylcyclotetrasiloxane and octaphenylcyclotetrasiloxane to produce a dimethylvinyl chain-stopped copolymer of dimethylsiloxane units and diphenylsiloxane units. The proportions of the various reactants are selected so as to insure that at least 50% of the silicon-bonded R groups are silicon-bonded methyl groups. In the preferred specific embodiment of my invention, R' is methyl and the dimethylvinyl chain-stopped polysiloxane contains 90 mole percent dimethylsiloxane units and 10 mole percent diphenylsiloxane units. The proportions of the chain-stopping units are selected so that the average molecule contains from about 50 to 2,000 silicon atoms to provide the value of $n$ set forth in Equation 1. In general, compositions within this polymer length have a viscosity at 25° C. of from about 100 centistokes to one million centistokes. While all of the R' groups of the polymers have been described as excluding aliphatically unsaturated groups, there is no reason why a minor proportion, e.g., up to about one-half mole percent, of vinyl or allyl or other unsaturated groups cannot be present, but no advantage is gained thereby and an excess of such groups will have an adverse effect on elongation of the foamed composition.

Component 2, comprising monofunctional $(R'')_3SiO_{0.5}$ units and tetrafunctional $SiO_2$ units, can consist only of the units just mentioned, in which case some of the R'' groups must be vinyl, or can comprise these two units plus difunctional $(R'')_2SiO$ units, in which case some of the R'' groups of both the monofunctional material and the difunctional material can contain silicon-bonded vinyl groups or all of the silicon-bonded vinyl groups can be present in the form of the difunctional $(R'')_2SiO$ units. Except for the fact that the units represented by R'' include vinyl groups, the scope of R'' is the same as the scope of R and R'.

In general, the various types of siloxane units in component 2 are selected so that the ratio of the $(R'')_3SiO_{0.5}$ units to the $SiO_2$ units is between 0.5:1 and 1:1. Where the copolymer of component 2 also contains $(R'')_2SiO$ units, it is preferable that these units be present in an amount equal to no more than about 10 mole percent, based on the total number of moles of siloxane units in the copolymer. Regardless of where the silicon-bonded vinyl groups are located in the copolymer of component 2, the silicon-bonded vinyl groups should be present in an amount equal to from about 2.5 to 10 mole percent of the copolymer component 2.

The copolymer component 2 is a solid, resinous material and is most often available as a solution in a solvent such as benzene or toluene, generally as a 40 to 60% by weight solution. For ease of handling in foamable compositions, this solution is usually dissolved in component 1 and the solvent stripped from the resulting solution to produce a solution of the solid copolymer component 2 in component 1. The proportion of the solution of component 2 is selected so as to give the desired ratio of component 2 to component 1.

The utility of the inorganic fibrous material component 3 employed in the practice of the present invention is quite surprising in that it would be expected that a relatively coarse material, such as this component, would interfere with the physical properties of the foamable compositions or at least would not serve to enhance these properties. Contrary to these expectations, it has been found that the incorporation of the inorganic fibrous material into the composition results in a foamed product of increased strength over foams prepared without such materials and serves the additional unique feature of imparting totally unexpected strength to the product resulting from the severe burning of the cured silicone foam. Since the silicone foam is generally flame-retardant, the temperatures required to burn the foam significantly are extremely high, but even after the majority of the composition is burned away, the resulting skeletal structure is extremely strong.

The particular fibrous materials which form component 3 are known in the art. The asbestos can vary among the many known types of asbestos, from the simple magnesium silicate types (chrysotile) to complex silicates including magnesium iron silicates (anthophyllite and amosite) or sodium iron silicates (crocidolite). The useful asbestos materials include crude asbestos and various assorted and milled asbestoses. The fiber length of the asbestos is also not critical, with both the short fiber materials and the long fiber materials being equally useful in the practice of the invention. The fibrous potassium titanate which can be employed as the fibrous inorganic material of component 3, either alone or in combination with the asbestos, is also a well known material and, in one commercial variety, is available under the tradename Tipersul as fibers having an average diameter of about 1 micron and having a fiber length of about 0.1 to 0.5 mm. Fibrous potassium titanate is also commercially available under the tradename PKT as fibers having a diameter about 0.2 micron and a length of about 0.005 to 0.15 mm.

The optional finely divided filler component 4 employed in the practice of the present invention can be used either as an extender or a viscosity modifier in the compositions of the present invention. Viscosity modification is sometimes desirable when the compositions of the present invention are prepared from very low viscosity vinyl chain-stopped organopolysiloxanes within the scope of Formula 1. With such low viscosity material in those applications in which it is desired to have a final composition of troweling consistency, the finely divided fillers serve to increase the apparent viscosity of the reaction mixture. The finely divided inorganic fillers which comprise component 4 include any of the finely divided inorganic fillers commonly used in connection with organopolysiloxanes. The preferred class of such fillers are the various silica fillers, such as silica aerogel, fumed silica, precipitated silica, and ground quartz, as well as other types of fillers, such as titanium dioxide, calcium silicate, ferric oxide, chromic oxide, cadmium sulfide, glass fibers, calcium carbonate, carbon black, lithopone, talc, etc.

The platinum catalyst compound 5 employed in the practice of the present invention includes all of the well known platinum catalysts which are effective for catalyzing the reaction between silicon-bonded hydrogen groups and aliphatically unsaturated groups. These materials include the various finely divided elemental platinum catalysts, such as shown in Patent 2,970,150—Bailey, the chloroplatinic acid catalysts described in Patent 2,823,218—Speier, the platinum hydrocarbon complexes of the type shown in Patents 3,159,601—Ashby and 3,159,662—Ashby, as well as the platinum alcoholate complexes which are described in Patent 3,220,972—Lamoreaux. Of these various groups of catalysts, the elemental platinum catalysts are the least preferred, since they lead to the slowest rate of reaction between the Si-H compounds and the silicon-bonded vinyl groups and for the further reason that elemental platinum is least efficient as a flame-retardancy additive. Accordingly, the platinum compound catalysts are the most preferred for processes of the present invention. Regardless of the type of platinum catalyst employed, the catalyst is used in an amount sufficient to provide from about $10^{-3}$ to $10^{-6}$ gram atoms platinum per mole of vinyl groups in the foamable composition.

The organohydrogenpolysiloxane component 6 is generally a composition of relatively simple molecular structure and is sometimes a mixture of such materials. One characteristic of the organohydrogenpolysiloxane is that it should have two silicon-bonded hydrogen groups per molecule. As such, one of the silicon-bonded hydrogen groups reacts with a silicon-bonded vinyl group of one of the compounds which comprise component 1 or component 2, and the second silicon-bonded hydrogen atom of the molecule can react with a silicon-bonded vinyl group of another of the vinyl-containing compounds which form component 1 or component 2.

One illustration of a specific organohydrogenpolysiloxane compound which can be employed in the practice of the present invention is 1,3,5,7-tetramethylcyclotetrasiloxane, which contains one silicon-bonded methyl group and one silicon-bonded hydrogen atom per silicon atom. Another illustrative material is a dimethylhydrogen chain-stopped dimethylpolysiloxane containing from two to three silicon atoms in the molecule. A further type of composition is one which comprises a copolymer of dimethylsiloxane units, methylhydrogensiloxane units, and trimethylsiloxane units and which contains 2 to 5 to 10 or more silicon atoms per molecule. A still further useful type of compound is the compound containing three dimethylhydrogensiloxane units and one monomethylsiloxane unit per molecule. Another useful material is the low viscosity fluid composed of dimethylhydrogensiloxane units and $SiO_2$ units in the ratio of two moles of the former to one mole of the latter. In addition to containing silicon-bonded methyl groups as illustrated by the specific compounds mentioned above, these compositions can also contain a wide variety of other organic groups, even though the preferred materials are those in which all of the R" groups of Formula 2 are methyl. No disadvantage is found in the preferred embodiment by substituting a minor portion of the methyl groups with phenyl groups.

The blowing agent component 7 is any blowing agent which is stable at room temperature but which releases an inert gas when subjected to elevated temperatures. Generally, the inert gas released by the blowing agent is nitrogen, but in some cases the inert gas can be carbon dioxide or other gas. Many blowing agents are commercially available. Illustrative of commercial blowing agents are, for example, azo-isobutyronitrile, dinitrosopentamethylene tetramine, benzenesulfonhydrazide N,N'-dinitroso-N,N'-dimethylterephthalamide, p,p' - oxy-bis(benzenesulfonhydrazide), terephthalazide, azodicarbonamide, etc.

In describing the preparation of the curable compositions of the present invention, emphasis will be given to the preparation of the two-package systems in which two separate packages are combined at the point of use, since this is the most advantageous commercial method of handling the foamable compositions. However, it should be understood that even when all the components are mixed together at point of use and maintained under refrigeration, the general principles involved are similar.

In preparing the first package which will be designated hereinafter as "package A," the divinyl chain-stopped polysiloxane component 1, the copolymer resin component 2, the fibrous inorganic material component 3, the optional finely divided inorganic filler component 4, and the platinum compound catalyst 5, are merely mixed using suitable mixing techniques. The precise order and method of addition of the components is not significant. However, the physical state of the components should be kept in mind. For example, the MQ resin component 2 is a solid material available as a solution in an organic solvent. Therefore, component 1 and the solution of component 2 are mixed and then the system is subjected to vacuum to remove solvent and form a solvent-free liquid to which the solid components are added. As previously mentioned, the desirability of adding the finely divided inorganic filler component 4 is a function of the economics of the application and the particular method by which the resulting product is going to be used. Thus, where it is important to keep the cost per unit volume of the silicone foam to a minimum, an extending filler is employed. Where the starting vinyl-stopped organopolysiloxane of Formula 1 is a low viscosity liquid and it is desirable to employ the foamed composition by troweling, it is also generally desirable to add the finely divided filler.

The particular proportions of the several ingredients for package A can be mixed in any of the ranges previously described. Generally speaking, the copolymer resin component 2 imparts additional strength to the final foam and therefore the amount of such component employed is a function of the strength desired in the final foam. Likewise, up to a point, the fibrous material increases the strength of the foam and, more importantly, increases the strength of the residue from the burning of the foamed material. The platinum catalyst serves the dual function of catalyzing the reaction mixture and increasing its flame retardancy. Thus, increasing the amount of the platinum catalyst increases the rate at which the composition cures and increases its flame retardancy. In any event, when the components of package A of the foamable composition are mixed, they can be stored indefinitely until time for use.

Package B, which is the second package of the two-package system, can consist entirely of the organohydrogenpolysiloxane component 6 and the blowing agent component 7 or can also include some of the vinyl chain-stopped organosiloxane component 1 and some of the filler component 4. The ingredients in package B can be mixed in any desirable fashion and order, with the proportions of the various components being selected to provide the desired proportions of ingredients when package B is mixed with package A in the desired amounts. Generally, the components in package B are selected so that from 0.05 to 1.0 part by weight of package B is mixed with one part of package A to produce the foamable composition.

The mixture of package A and package B can be effected in any desired fashion at the time and place of use to form a foamable composition. The foamable composition is then heated to the foaming and curing temperature and allowed to form the desired foam.

The foamable compositions of the present invention can be used in conventional fashions. For example, where it is desired to prepare blocks of foam which are subsequently to be placed into the position of use, the foamable composition is merely placed in a suitable container and the entire container and its contents heated to the temperature at which foaming and curing is to be effected. Generally, this temperature is a function of the particular blowing agent employed, and the particular platinum catalyst employed, but generally is in the range of from about 80 to 180° C. An ideal container is a preformed container of silicone rubber which will withstand the temperature of curing and which generally will release the foam with little trouble. Often it is desired to insulate parts which are small enough to be placed in ovens so that the composition is merely spread or troweled or doctored onto the surface of the article to be insulated and the entire article is placed in an oven, such as a circulating air oven, and maintained at the curing temperature of about 80 to 180° C. until the mixture has foamed and cured. As a further method of applying the composition, the composition can be sprayed or troweled onto the surface to be insulated and the composition can be heated with a conventional heat gun to raise the temperature to the foaming and curing temperature. Regardless of the method of cure employed, care must be taken to insure adequate ventilation for the decomposition products of the curing reaction so as to avoid any hazards.

In the case in which the foams of the present invention are to be used as insulation bonded to the surface of metallic parts, it is sometimes desirable to prime the parts prior to the application of the foamable compositions thereto. The parts can be primed in the usual fashion which involves the thorough cleaning of the metal parts and then the application of some suitable priming agent, such as a mixture of ethyl silicate and methyltriacetoxysilane with a minor amount of some condensation catalyst, such as ferric chloride. The priming is effected in the usual manner known to those skilled in the art.

The following examples are illustrative of the practice of the present invention and not intended for purposes of limitation. All parts are by weight.

Examples 1 through 10, which follow, describe ten different compositions, the first eight of which are within the scope of the present invention, which are prepared from varying proportions of a common group of components. The vinyl chain-stopped polysiloxane base polymer component 1 employed in Examples 1 through 10 was a dimethylvinyl chain-stopped copolymer of dimethylsiloxane units and diphenylsiloxane units which had a viscosity of about 4,000 centistokes at 25° C., which contained diphenylsiloxane units and dimethylsiloxane units in the ratio of approximately 5 mole percent of the former to 95 mole percent of the latter, and which falls within the scope of Formula 1 when R is methyl, R' is a mixture of methyl and phenyl, and $n$ has a value of about 600. Component 2, which is the vinyl-containing resinous copolymer, is a 50% xylene solution of copolymer containing trimethylsiloxane units, $SiO_2$ units and methylvinylsiloxane units. The various units are present in an amount sufficient to provide 0.8 trimethylsiloxane units per $SiO_2$ unit and with the methylvinylsiloxane units present in an amount such that 7.0 mole percent of the silicon atoms are present as a methylvinylsiloxane unit and the remaining silicon atoms are present as a portion of a trimethylsiloxane unit or an $SiO_2$ unit. Component 1 and the solution of component 2 were premixed in the proportions required by the examples and the mixture was heated at 110° C. and 25 mm. for four hours to remove the xylene solvent and form a solution of component 2 in component 1.

The fibrous material component 3 in the compositions was either fibrous potassium titanate which has been described earlier, or a medium fiber asbestos material. Component 4, the finely divided filler, was one or more of either finely divided quartz having an average particle size less than about 5 microns, a finely divided fumed silica having a surface area greater than about 200 square meters per gram, or a finely divided titania. The platinum catalyst component 5 was one part chloroplatinic acid dissolved in one part n-butyl alcohol. These five components formed the first package (package A) of a two-package foamable composition.

The organohydrogenpolysiloxane component 6 was a 10 centistoke liquid copolymer of dimethylhydrogensiloxane units and $SiO_2$ units containing an average of 2 of the dimethylhydrogensiloxane units per $SiO_2$ unit. The blowing agent component 7 was N,N'-dinitroso-N,N'-dimethylterephthalamide. The silicon-hydrogen compound component 6 and the blowing agent 7, along with two optional ingredients, comprised the second package (package B) of the two-package foamable composition. The optional ingredients were quartz of the type previously described and a minor amount of the base polymer described as component 1.

In Table I, which follows, the parts of each of the components and optional ingredients of each of the two packages which form the two-package foamable composition are listed. The numbers in the table are parts by weight, except for the composition comprising the component 5 platinum catalyst which is listed on the basis of gram atoms platinum per gram atom of silicon-bonded vinyl groups in the base polymer which forms the major portion of package A, and the vinyl groups of the resinous copolymer which forms component 2 and the base polymer which forms a minor portion of package B.

TABLE I

| | Example Number | | | | | | | | | |
|---|---|---|---|---|---|---|---|---|---|---|
| | 1 | 2 | 3 | 4 | 5 | 6 | 7 | 8 | 9 | 10 |
| Package A: | | | | | | | | | | |
| Component (1) (Base Polymer) | 100 | 100 | 100 | 100 | 100 | 100 | 100 | 100 | 100 | 100 |
| Component (2) (MQ Polymer) | 43 | 43 | 43 | 43 | 43 | 43 | 43 | 33 | 33 | 33 |
| Component (3) (Fibrous Material): | | | | | | | | | | |
| Asbestos | | 43 | | 43 | | | | 13 | 7 | 7 |
| Titanate | 26 | | 29 | | 29 | 36 | 36 | | | |
| Component (4) (Filler): | | | | | | | | | | |
| Quartz | 36 | 43 | 57 | 57 | 57 | 36 | | 100 | | 80 |
| Silica | 7 | 14 | 7 | 10 | 7 | 7 | 14 | | 12 | |
| Titania | | | 14 | 14 | | | | | | |
| Component (5) ($H_2PtCl_6.6H_2O$) (Ratio) | $10^{-5}$ | $10^{-5}$ | $10^{-5}$ | $10^{-5}$ | $10^{-5}$ | $10^{-5}$ | $10^{-5}$ | $10^{-5}$ | $10^{-5}$ | $10^{-5}$ |
| Package B: | | | | | | | | | | |
| Component (6) (Si–H) | 7 | 7 | 7 | 7 | 8 | 8 | 9 | 7 | 9 | 8 |
| Component (7) (Blowing Agent) | 3 | 3 | 3 | 3 | 4 | 4 | 5 | 3 | 5 | 4 |
| Optional ingredients: | | | | | | | | | | |
| Quartz | 4 | 4 | 4 | 4 | 5 | 5 | 6 | 4 | 6 | 5 |
| Base Polymer | 7 | 7 | 7 | 7 | 8 | 8 | 9 | 7 | 9 | 8 |

In employing the composition shown in Table I, package A and package B were mixed with stirring, with the proportions of the two packages being selected so as to provide the relative amounts of components shown in the examples of the table. Generally, this required the mixing of approximately 10 parts of the package A material to one part of package B material for the particular formulations of Table I. As soon as the two packages were mixed, they were spread on the surface of an aluminum plate to a thickness of ¼ inch, and the plate was heated at a temperature of 150° C. for 10 minutes, during which time the composition foamed and cured to produce a uniform silicone elastomer foam having a specific gravity of from about 0.7 to about 0.8. All ten of the compositions of Table I formed a satisfactory foam.

In order to evaluate each of the coated panels, the panels were exposed to a 2,000° F. flame at a 45° angle for 15 minutes. None of the ten coated panels propagated the flame. However, the panels prepared with the foams of Examples 9 and 10 were severely cracked after the foam test and the surface of the metal was exposed through the cracks. On the other hand, after the flame test, the coatings of Examples 1 through 8 were badly charred but were still uncracked and a coating was available to protect the metal surface. The foams of Examples 9 and 10 were prepared from mixtures of ingredients outside of the scope of the present invention, since the inorganic fibrous material, component 3, was present in an amount less than 10 parts per 100 parts of base polymer A.

Example 11

A curable composition was prepared by thoroughly mixing a group of ingredients consisting of (1) 100 parts of a 100 centistoke diphenylvinyl chain-stopped dimethylpolysiloxane fluid containing about 90 dimethylsiloxane units per molecule and falling within the scope of Formula 1 when R is phenyl, R' is methyl, and $n$ is equal to 90, (2) 100 parts of a 50% solution in xylene of a resinous polysiloxane containing dimethylvinylsiloxane units and $SiO_2$ units in the ratio of one-half mole of the former to one mole of the latter, and heating the resulting mixture at a temperature of about 70° C. under vacuum to strip the xylene solvent from the mixture, (3) 100 parts of a fibrous potassium titanate having a diameter of about one micron and a length of about 0.08 mm., (4) a sufficient amount of finely divided platinum deposited on gamma-alumina to provide 10⁻⁴ gram atoms platinum per mole of silicon-bonded vinyl groups in the vinyl-containing organopolysiloxanes described above, one part of α,α'-azo-diisobutyronitrile and 10 parts of tris-(dimethylhydrogensiloxy)methylsiloxane. A sufficient amount of this material was poured into a silicone rubber tray to provide a depth of 1.0 inch. The tray was put into a circulating air oven heated to a temperature of 170° C. and maintained in this oven for 10 minutes. At the end of this time, the foam was taken from the tray and found to be a uniform foam of a thickness of about 1.5 inches and with a specific gravity of about 0.75. Another portion of this material was poured onto the surface of a freshly cleaned steel panel and the assembly was heated with a conventional heat gun for a time sufficient to cure and foam the composition. This resulted in a ½" thick uniform foam on the surface of the steel. This coating was exposed to a 5000° F. oxyacetylene torch for one minute and the resulting material remained an integral layer available to protect the steel surface even though the major portion of the silicone was burned away.

Example 12

A foamable composition was prepared by mixing (1) 100 parts of a diphenylvinyl chain-stopped copolymer of dimethylsiloxane units and diphenylsiloxane units having a viscosity of about 500,000 centistokes and containing approximately 20 mole percent diphenylsiloxane units and 80 mole percent dimethylsiloxane units, (2) 10 parts of a xylene solution of equal parts by weight of a dimethylvinylsiloxane, $SiO_2$, and diphenylsiloxane copolymer with the dimethylvinylsiloxane units and $SiO_2$ units being present in equimolar amounts and with the diphenylsiloxane units comprising two mole percent of the total moles of siloxane units. This mixture was heated at a temperature of 90° C. at reduced pressures to strip the benzene to form a solution of the two siloxanes. This was then mixed with (3) 10 parts of a mixture of equal parts by weight of asbestos fibers and fibrous potassium titanate, (4) 10 parts by weight of a mixture of equal parts by weight of finely divided carbon black and finely divided quartz, (5) a sufficient amount of the platinum ethylene complex described in Example 2 of Patent 3,159,601, Ashby, to provide 10⁻⁶ gram atoms of platinum per mole of silicon-bonded vinyl groups in the siloxanes, (6) 5 parts of N,N'-dinitrosopentamethylenetetramine and (7) 5 parts of a dimethylhydrogen chain-stopped copolymer of methylhydrogensiloxane units and dimethylsiloxane units. This copolymer had a viscosity of about 1,000 centistokes, contained about 350 silicon atoms per molecule, with about 6% of the siloxane units being methylhydrogensiloxane units. This composition was troweled onto a stainless steel surface to a thickness of ⅜" and then the resulting assembly was heated at a temperature of 125° C. for 20 minutes during which time the composition cured and foamed to a uniform foam having a density of about 0.85. In order to evaluate this material, the sample was suspended in a glass chimney and subjected to a 2,000° F. gas flame for 20 seconds. During this time, the coating did not ignite or support combustion and no cracking or loss of flexibility occurred.

While the foregoing examples have illustrated many of the embodiments of my invention, it is understood that the foamable compositions of the present invention comprise the broad group of materials heretofore described with each of the components of the composition varying within the previously defined limits. These foam compositions are especially useful for thermal insulation in areas where the insulation is subjected to extremes of temperature and to open flames, since their resistance to combustion and their structured combustion product produces an insulating material useful in environments where other insulating materials are totally unacceptable.

What I claim as new and desire to secure by Letters Patent of the United States is:
1. A foamable composition comprising,
    (1) 100 parts of a vinyl chain-stopped polysiloxane having the formula:

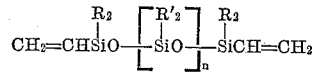

where R and R' are monovalent hydrocarbon radicals free of aliphatic unsaturation with at least 50 mole percent of the R' groups being methyl and $n$ has a value of from about 50 to 2,000, inclusive,
    (2) from 10 to 100 parts of an organopolysiloxane copolymer comprising $(R'')_3SiO_{0.5}$ units and $SiO_2$ units and in which from about 2.5 to 10 mole percent of the silicon atoms contain silicon-bonded vinyl groups, where R'' is a member selected from the class consisting of vinyl radicals and monovalent hydrocarbon radicals free of aliphatic unsaturation,
    (3) from 10 to 100 parts of an inorganic fibrous material selected from the class consisting of asbestos, fibrous potassium titanate and mixtures thereof,
    (4) from 0 to 50 parts of a finely divided filler,
    (5) a platinum catalyst,
    (6) an amount of a liquid organohydrogenpolysiloxane having the formula:

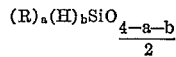

where R is a monovalent hydrocarbon radical free of aliphatic unsaturation, $a$ has a value of from 1.00 to 2.10, $b$ has a value of from about 0.1 to 1.0, and the sum of $a$ plus $b$ is about 2.00 to 2.67, said organohydrogenpolysiloxane being present in an amount sufficient to provide from about 0.5 to 1.0 silicon-bonded hydrogen atoms per silicon-bonded vinyl group in said composition, and
    (7) from 1 to 5 parts of a blowing agent.
2. The foamed and cured product of claim 1.

References Cited

UNITED STATES PATENTS 3,070,555 12/1962 Bruner.
3,249,581 5/1966 Nelson _____ 260—825
3,271,332 9/1966 Bond et al.
3,313,773 4/1967 Lamoreaux _____ 260—825

FOREIGN PATENTS 614,771 7/1962 Belgium.

MURRAY TILLMAN, Primary Examiner.

M. FOELAK, Assistant Examiner.

U.S. Cl. X.R.
260—37, 46.5, 825